United States Patent [19]
Apollonov et al.

[11] Patent Number: 5,757,562
[45] Date of Patent: May 26, 1998

[54] MIRROR WITH REFLECTION COEFFICIENT VARIABLE SPATIALLY IN AMPLITUDE AND IN PHASE

[75] Inventors: Victor Victorovich Apollonov; Vladmir Ivanovitch Acsinin; Alexis Borissovitch Egorov; Yuri Lvovitch Kalachev; Vadim Veniaminovitch Kiyko; Victor Ivanovitch Kislov; Alexander Mihailovitch Prokhorov, all of Moscou, Russian Federation; Jean Cornillault, Nozay, France

[73] Assignee: Compagnie Industrielle Des Lasers Cilas, Marcoussis, France

[21] Appl. No.: 790,324

[22] Filed: Jan. 28, 1997

[30] Foreign Application Priority Data

Jan. 31, 1996 [RU] Russian Federation ............. 96101830

[51] Int. Cl.$^6$ ............................. G02B 5/08; G02B 7/182
[52] U.S. Cl. ................................. 359/846; 359/847
[58] Field of Search ........................... 359/845, 846, 359/847, 849

[56] References Cited

U.S. PATENT DOCUMENTS

| 4,954,700 | 9/1990 | Trozpek | 250/201.9 |
| 5,229,889 | 7/1993 | Kittell | 359/849 |
| 5,357,539 | 10/1994 | Otani et al. | 372/107 |

FOREIGN PATENT DOCUMENTS 3119823  12/1982  Germany ........................ 359/849

*Primary Examiner*—Paul M. Dzierzynski
*Assistant Examiner*—Mark A. Robinson
*Attorney, Agent, or Firm*—Marshall, O'Toole, Gerstein, Murray & Borun

[57] ABSTRACT

A mirror having a reflection coefficient that is spatially variable in amplitude and in phase includes at least two parallel spaced reflecting plates. One of the plates is displaced parallel to itself to vary the distance between the plates. At least one of the reflecting plates can be deformed transversely to its plane.

8 Claims, 3 Drawing Sheets

MIRROR WITH REFLECTION COEFFICIENT VARIABLE SPATIALLY IN AMPLITUDE AND IN PHASE

BACKGROUND OF THE INVENTION

1. Field of the Invention

The present invention concerns a mirror with a reflection coefficient that is variable spatially in amplitude and in phase.

2. Description of the Prior Art

As a general rule, the reflection properties of a mirror are homogeneous and it is sometimes necessary to modify these reflection properties locally, for example:

a) to correct local disturbances of phase caused by reflective index variations on the path of light beams; or b) to reduce the intensity at the periphery of a laser beam, to reduce diffraction phenomena and to reduce divergence; or c) to control the reflection coefficient of a mirror to tune it to a precise wavelength.

Situation a) concerns active or adaptive optics and the solutions employed are:

a mirror comprising a reflective plate fixed at its periphery and supported by piezo-electric material pistons. The reflecting plate can be deformed in accordance with the voltage applied to each piston. The shape of the mirror can therefore be changed at will and in real time. A light wave impinging on the mirror is subjected to local phase variation. By conjugating the mirror with an imaging system, it is also possible to deform or to displace an image; or a mirror formed of a metallic membrane of piezo-electric material between 0.5 μm and 1.5 μm thick placed between a transparent electrode deposited on the surface of a glass plate and a set of discrete electrodes. The first electrode receives the displacement voltage and the discrete electrodes receive the control signals. This type of mirror also enables local control of the phase of the reflected beam. Its structure is complex and requires the use of unusual technological operations, not to mention the impossibility of using the mirror in high power lasers, because the thickness of the multi-dielectric deposit can exceed the thickness of the membrane. This would effect the possibility of controlling the membrane.

To deal with situation b) above, mirrors with variable reflectivity are used in the laser cavities. These variable reflectivity laser cavity mirrors can be obtained in the following manner, which is known in itself:

by depositing interference layers having a thickness which varies as a function of the distance from the axis. The law of variation is fixed. It may be of the Gaussian or even super-Gaussian type. This reduces the intensity at the edges of the beam and thereby minimizes diffraction phenomena. Using this method, it is possible to obtain beams with a single transverse mode that are much more intense than using constant reflectivity mirrors. This device is static. It cannot be modified to adapt the reflectivity to a given laser operation. Note that the implementation of these multi-dielectric treatments is relatively complex; or by placing a circular diaphragm between the plates of a Fabry and Pérot type interferometric mirror, one of which plates is disposed on a piezo-electric actuator, enabling the thickness of the interferometer to be modified. This type of mirror produces a staircase profile of the reflection coefficient. Outside the diaphragm aperture, only the first plate is active: the reflection coefficient is that of this plate. Within the diaphragm is an interferometric etalon of variable thickness. For a given wavelength, the reflection coefficient is a function of the thickness of the interferometer. The defects of a mirror of this kind include the small number of functions of the complex reflection coefficient that can be obtained, because of the discontinuous character (staircase function) of the characteristic in amplitude and in phase. Moreover, the amplitude and the phase of the reflection coefficient are linked. This generally rules out obtaining a reflection coefficient with a given distribution. Another defect of this mirror is that it is impossible to use it in power lasers because of the low resistance of the diaphragm to the flux, related to thermal edge effects.

The present invention concerns a mirror that is also similar to a Fabry and Pérot type interferometric mirror, but which eliminates the disadvantages of the last of the prior art mirrors described hereinabove.

SUMMARY OF THE INVENTION

To this end, a mirror in accordance with the invention having a reflection coefficient that is spatially variable in amplitude and in phase includes at least two parallel spaced reflecting plates, means for displacing one of said plates parallel to itself to vary the distance between said plates and means for deforming at least one of said reflecting plates transversely to its plane.

The present invention thus provides a mirror having a complex reflection coefficient that is spatially non-uniform and can be controlled in real time. This makes it possible to control the distribution of the phase and of the amplitude of reflected radiation.

Note that said reflecting plates can be partially reflecting or highly reflecting.

One or both plates can be deformed and the thickness of the mirror can be varied in accordance with required laws.

As a laser resonator mirror, the mirror of the invention increases the power of the emitted radiation and reduces its divergence.

If it is used in imaging devices, the mirror of the invention improves the contrast and the resolution of the image by optimizing the amplitude/frequency characteristics of the optical system.

Compared to the prior art systems, it offers increased efficiency associated with:

the broadening of the category of functions that can be implemented: complex and spatially non-uniform reflection coefficients.

the possibility of varying independently the spatial distributions of the phases and the amplitudes.

This mirror is universal because it enables the parameters of the cavity to be optimized while the laser is operating. It does not require a succession of measurements and of modifications of the correction function, like the others, to the extent that the previous calculation of the parameters of a laser is generally approximate because of the complexity of the laser as a system and because of the absence of exact theoretical models.

The same advantages are obtained if this mirror is used in imaging systems.

At the industrial level, the importance of the present invention results from:

the fact that the mirror of the present invention may not only be incorporated in laser systems or imaging systems during the design process but also used to improve existing systems. An existing system does not require major modifications, since it is sufficient to replace the existing mirror by the mirror of the invention;

the fact that the production of the mirror of the invention does not raise any particular problems. A relatively small range of products capable of covering virtually all applications is readily conceivable.

The figures of the accompanying drawings show how the invention may be put into effect. In the figures, the same reference numbers denote similar components.

DETAILED DESCRIPTION OF THE PREFERRED EMBODIMENTS

Figure 1:
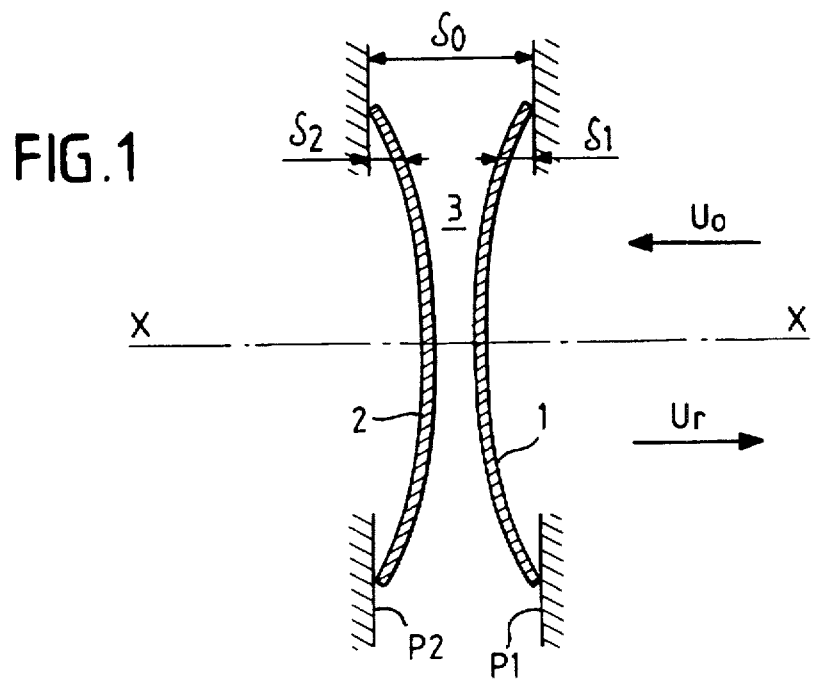
FIG. 1 is a schematic showing the principle of the present invention.

FIG. 1 is a schematic showing part of a Fabry and Pérot etalon having an axis X—X and two partially or highly reflecting plates 1 and 2 of circular or rectangular shape that have been deformed in a direction orthogonal to themselves. Accordingly, relative to their bearing planes P1 and P2, said plates 1 and 2 have a convex shape (if said plates 1 and 2 are circular, their convex shape is that of a dome; if they are square or rectangular, their convex shape is cylindrical).

Each point of the etalon is defined by polar coordinates r and $\phi$, with the origin at the intersection of the optical axis X—X and a plane parallel to the bearing planes P1, P2. Thus the distance parallel to the axis X—X between a point on the plate 1 and a point on the plate 2 is a function $\delta(r,\phi)$ of said polar coordinates r and $\phi$. Letting:

$\delta_0$ be the fixed distance between the bearing planes P1 and P2, $\delta_1$ $(r,\phi)$ be the variable distance of each point on the plate 1 from the bearing plane P1, and $\delta_2$ $(r,\phi)$ be the variable distance of each point on the plate 2 from the bearing plane P2, we may write:

$$\delta(r,\phi) = \delta_1(r,\phi) + \delta_2(r,\phi) + \delta_0$$

If an incident wave $U_o$ impinges on the etalon from the side of the plate 1, the amplitude and phase distribution of the reflected wave $U_r$ is a function that depends on the characteristics of the Fabry and Pérot etalon system, including the shape of the plates and the distance between them. We may write:

$$U_r = U_o \times R(r,\phi) \quad (1)$$

$R(r,\phi)$ being the complex reflection coefficient of said Fabry and Pérot etalon (complex in the sense of having a real part and an imaginary part).

Given the properties of Fabry and Pérot interferometers, we may write:

$$R(r,\phi) = e^{2ik\delta_1(r,\phi)}\left[ R_1 - T_1^2 R_2 \frac{e^{2ik\delta(r,\phi)n}}{1 - R_1 R_2 e^{2ik\delta(r,\phi)n}} \right] \quad (2)$$

In this equation (2), the parameters as yet undefined have the following meanings:

$R_1$: amplitude reflection coefficient of plate 1, $R_2$: amplitude reflection coefficient of plate 2, $T_1$: amplitude transmission coefficient of plate 1, $\lambda$: wavelength of incident wave, n: refractive index of medium 3 between plates 1 and 2, k: wave number ($k = 2\pi/\lambda$).

Thus, at any point on the etalon, for a given wavelength, the complex reflection coefficient of the etalon depends only on the parameters $R_1$, $R_2$, $T_1$ and n and on the distances $\delta(r,\phi)$ and $\delta_1(r,\phi)$.

Consequently, it is possible to derive a required amplitude and phase relationship between the incident wave $U_o$ and the reflected wave $U_r$ by appropriately calculating the profiles of the plates 1 and 2 and the distance between them, using equations (1) and (2).

At each point with coordinates r and $\phi$, the distance $\delta(r,\phi)$ between the plates 1 and 2 is given by:

$$\delta(r,\phi) = \frac{1}{2kn} \text{Arccos}\left[ \frac{(1 + R_1 R_2^2)(R_1^2 - |R(r,\phi)|^2) + T_1^2 R_2^2(T_1^2 + 2R_1^2)}{2R_1 R_2(R_1^2 + T_1^2 - |R(r,\phi)|^2)} \right]$$

Moreover, the shape of the surface of the plate 1 is given by:

$$\delta_1(r,\phi) = \frac{1}{2k}\left[ \phi_r(r,\phi) - \arg\left( \frac{R_1 - T_1^2 R_2 e^{2ik\delta(r,\phi)n}}{1 - R_1 R_2 e^{2ik\delta(r,\phi)n}} \right) \right]$$

From equation (1) we can deduce that the shape of the surface of the plate 2 is given by:

$$\delta_2(r,\phi) = \delta(r,\phi) - \delta_1(r,\phi) - \delta_0$$

In the above equations, the meaning of the various parameters is the same as above. Moreover, the function $\Phi_r(r,\phi)$ is defined by the expression $(i\Phi_r(r,\phi))$ which represents the complex reflection coefficient $R(r,\phi)$.

Figure 2:
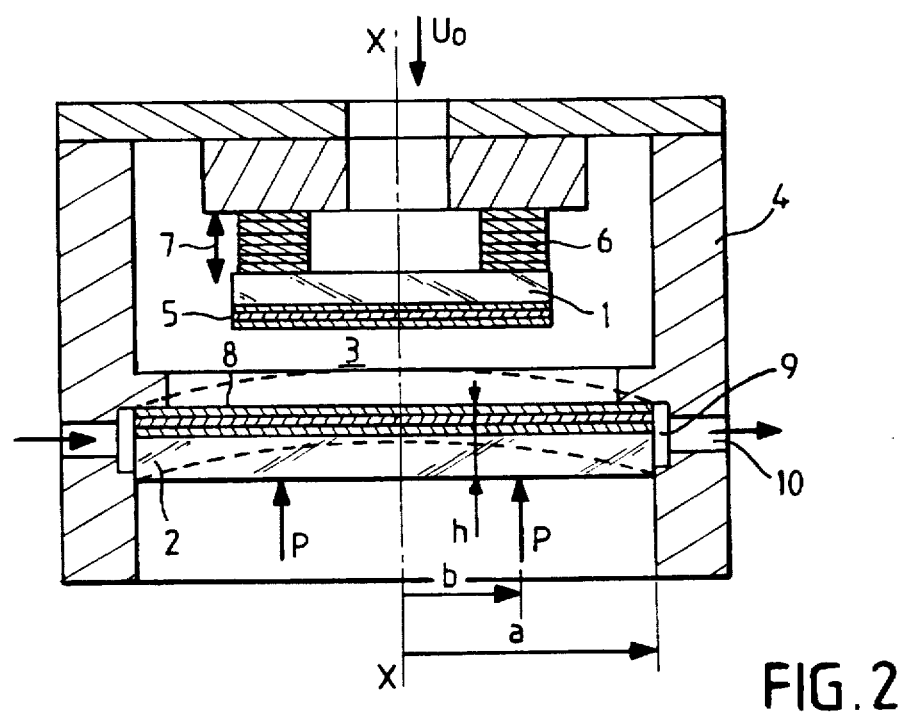
FIG. 2 is a schematic axial cross-section of a first embodiment of the mirror of the present invention.

In the embodiment of the mirror of the present invention shown in FIG. 2 the plates 1 and 2 are circular discs mounted in a frame 4.

The plate 1, which receives the incident wave $U_o$, is a silica disc 20 mm in diameter and 3 mm thick, for example. On the side facing towards the plate 2, the plate 1 receives a partially or highly reflecting multi-dielectric coating 5. The plate 1 is fixed to the mount 4 through the intermediary of an annular piezo-electric actuator 6 which can move said plate 1 parallel to itself along the axis X—X (arrows 7). The outside diameter of the actuator 6 can be in the order of 23 mm, its inside diameter then being approximately 13 mm.

The plate 2 is a silica disc 40 mm in diameter and 5 mm thick, for example. Its side facing towards the plate 1 receives a partially or highly reflecting multi-dielectric coating 8 and the total thickness of the plate 2 is h.

The circular edge of the plate 2 is built into the mount 4 and the latter includes water circulation means 9, 10 at the edge of said plate 2 to stabilize the temperature of the system. The radius of the plate 2 inside the mount 4 is denoted a.

The space 3 is filled with air.

On the side opposite the plate 1, the plate 2 is subjected to an annular force P (for example a fluid pressure), at a radius b and concentric with the axis X—X.

The force P causes the plate 2 to assume a convex shape shown in dashed outline, displaced towards the plate 1. This shape is then defined by the following equation:

$$\delta_2(r) = \left(\frac{P}{2\pi D}\right)(b^2 + r^2)\ln\left(\frac{b}{a}\right) + (a^2 + r^2)\left(\frac{a^2 + r^2}{2a^2}\right) \quad (3)$$

with:

$$D = \frac{Eh^3}{12(1-v)} \quad (4)$$

In the above equations, E and v are respectively the Young's modulus and the Poisson's coefficient of the plate 2.

Note that when the force P is annular about the axis X—X, the deformation of the plate 2 is one of revolution about said axis with the result that the polar coordinate $\phi$ disappears from equation (3). Moreover, in this embodiment, the plate 1 is not subjected to any deformation and remains flat, with the result that $\delta_{1(r,\phi)} = 0$.

The FIG. 2 embodiment has been tested as a mode selector in an Nd:YAG power laser having a continuous power rating of 400 W.

Figure 3A:
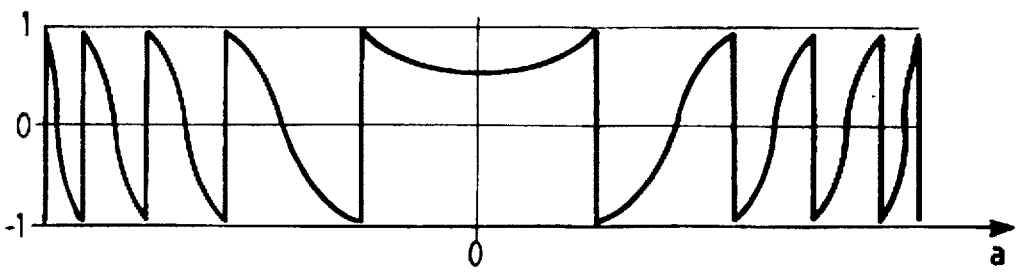
FIGS. 3a and 3b respectively show the phase and the amplitude of the reflection coefficient of the mirror from FIG. 2.
Figure 3B:
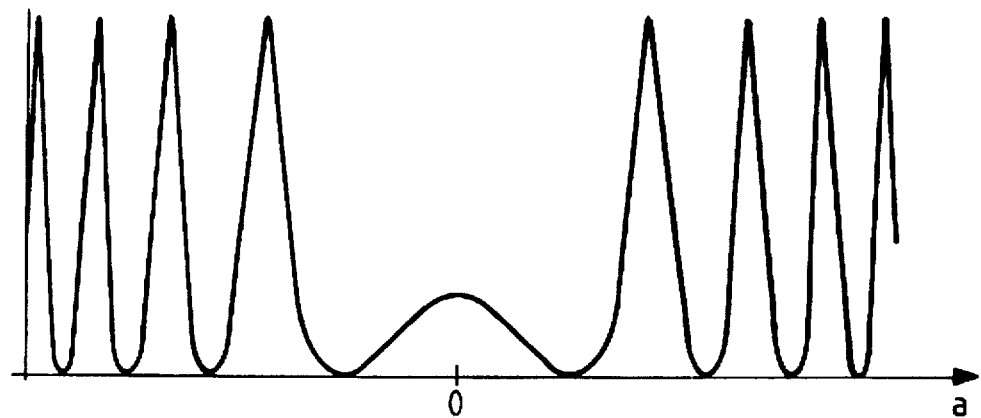

FIGS. 3a and 3b respectively show the phase and the amplitude of the reflection coefficient of the mirror from FIG. 2 plotted on the ordinate axis as a function of the radius of said mirror plotted on the abscissa axis. They show that this mirror produces a distribution of the reflection coefficient in the form of concentric rings.

Experiments have shown that it is possible to optimize the reflectivity of the mirror from FIG. 2 so that the divergence of the beam emitted is reduced by a factor of 2 or 3 for a power reduction of only 20% to 30%.

From the foregoing it will be understood that using the FIG. 1 mirror with two rectangular plates fixed along two opposite edges, and therefore of convex cylindrical shape, it is easy to obtain a distribution of the reflection coefficient in the form of equi-distant stripes. A mirror with three parallel plates could be used to obtain an array of reflective points, as necessary for a laser based on the Talbot effect, for example.

Figure 4:
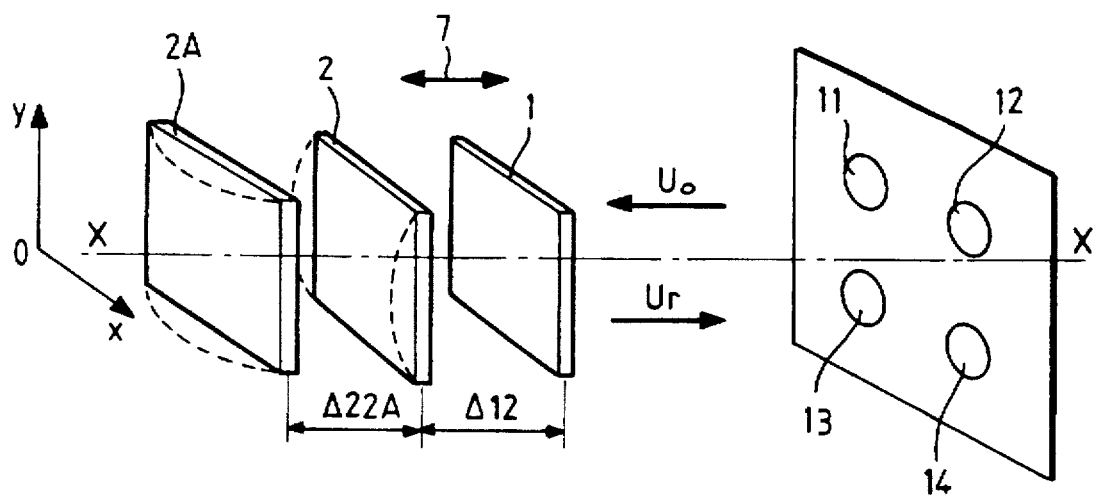
FIG. 4 is a schematic showing a second embodiment of the mirror of the invention.

FIG. 4 is a schematic showing an embodiment of the mirror of the invention with three partially or highly reflecting plates 1, 2 and 2A.

The three plates 1, 2 and 2A are rectangular in shape. The plate 1 may be displaced parallel to the axis X—X (arrows 7) and the plates 2 and 2A may be deformed (for example by fluid pressure) to assume cylindrical shapes (shown in dashed line). The generatrices of the cylindrical shapes of the two plates 2 and 2A are orthogonal.

In this case, the function of the mirror is given by the following equation:

$$U_r = U_o \left(\frac{R_1 - Je^{2ik\delta_1}}{1 - R_1 Je^{2ik\delta_1}}\right)$$

with:

$$J = \frac{R_2 - R_3 e^{2ik\delta_2}}{1 - R_2 R_3 e^{2ik\delta_2}}$$

-continued $$\delta_1 = s_1 + \Delta_{12} \quad \delta_2 = \Delta_{22A}$$
$$s_1 = \alpha_x x + \alpha_y y \quad s_2 = \beta_x x + \beta_y y$$

x and v are the coordinates of the current point of the mirror in the rectangular system of axes $O_{xy}$. $\Delta_{12}$ is the distance between the plates 1 and 2, $\Delta_{22A}$ is the distance between the plates 2 and 2A, $\alpha_x$ and $\alpha_y$ are the local angles of inclination of the plate 2 relative to the plate 1, $\beta_x$ and $\beta_y$ are the angles of inclination of the plate 2A relative to the plate 1.

Figure 5:
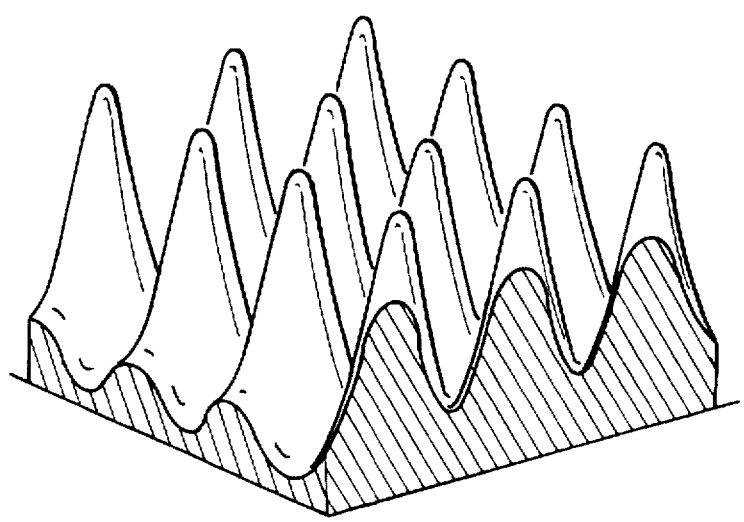
FIG. 5 is a perspective representation of the amplitude distribution of the reflection coefficient of the mirror from FIG. 4.

FIG. 5 shows the amplitude distribution of the reflection coefficient.

With a mirror of this kind four independent laser beams (passing through openings 11 through 14) can be combined into a single beam.

There is claimed:

1. A mirror having a reflection coefficient that is spatially variable in amplitude and in phase and includes at least two parallel spaced reflecting plates, means for displacing one of said plates parallel to itself to vary the distance between said plates and means for deforming the other of said reflecting plates transversely to its plane.

2. The mirror claimed in claim 1 wherein said deformation of said plate(s) is such that the distance $\delta(r,\phi)$ between said plates is a function of the polar coordinates (r and $\phi$) of the current point of the mirror defined by the equation:

$$\delta(r,\phi) = \frac{1}{2kn} \text{Arccos}\left[\frac{(1 + R_1R_2^2)(R_1^2 - |R(r,\phi)|^2) + T_1^2R_2^2(T_1^2 + 2R_1^2)}{2R_1R_2(R_1^2 + T_1^2 - |R(r,\phi)|^2)}\right]$$

in which:

r and $\phi$ are the polar coordinates of the current point of the surface of the mirror in a system of polar coordinates concentric with the optical axis of said mirror, k is the wave number equal to $2\pi/\lambda$ where $\lambda$ is the wavelength, n is the refractive index of the medium between said plates, $R_1$ is the amplitude reflection coefficient of the first plate encountered by an incident beam, $R_2$ is the amplitude reflection coefficient of the second plate encountered by said incident beam, $T_1$ is the amplitude transmission coefficient of said first plate, and $T_2$ is the amplitude transmission coefficient of said second plate.

3. The mirror claimed in claim 2 wherein the shape of the surface of a deformed plate is given by the equation:

$$\delta_1(r,\phi) = \frac{1}{2k}\left[\phi(r,\phi) - \arg\left(\frac{R_1 - T_1^2 R_2 e^{2ik\delta(r,\phi)n}}{1 - R_1 R_2 e^{2ik\delta(r,\phi)n}}\right)\right]$$

and the shape of the surface of the other plate is given by the equation:

$$\delta_2(r,\phi) = \delta(r,\phi) - \delta_1(r,\phi) - \delta_0$$

in which:

$\delta_0$ is the fixed distance between said two plates, $\delta_1(r,\phi)$ is the distance between the current point of said deformed plate and the bearing plane thereof, $\delta_2(r,\phi)$ is the distance between the current point of said other plate and the bearing plane thereof, and $\delta_r(r,\phi)$ is defined by the complex reflection coefficient of the mirror $\exp(i\Phi_r(r,\phi))$.

4. The mirror claimed in claim 1 wherein said plates are disc shape and are deformed by said deformation means into a dome shape.

5. The mirror claimed in claim 1 wherein said plates have a square or rectangular shape and are deformed by said deformation means into a cylindrical shape.

6. The mirror claimed in claim 1 wherein said deformation means comprise a fluid under pressure.

7. A mirror as claimed in claim 1 comprising three parallel reflecting plates spaced from each other in pairs and wherein said deformation means deform two of said plates.

8. The mirror claimed in claim 7 wherein said plates have a square or rectangular shape and are deformed into a cylindrical shape, the generatrices of the cylindrical surface formed by one of said deformed plates being orthogonal to the generatrices of the cylindrical surface formed by the other of said deformed plates.

* * * * *